United States Patent
Jung et al.

(10) Patent No.: US 8,525,946 B2
(45) Date of Patent: Sep. 3, 2013

(54) LIQUID CRYSTAL DISPLAY APPARATUS HAVING DIFFERENT SIZE AND AMOUNT OF PATTERNS FORMED ON DIFFERENT AREAS OF BOTTOM SURFACE OF A LIGHT GUIDE PANEL OF A BACKLIGHT UNIT

(75) Inventors: Il-yong Jung, Yongin-si (KR);
Myung-ryul Jung, Suwon-si (KR);
Dae-hee Lee, Hwaseong-si (KR);
Kyung-ock Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 942 days.

(21) Appl. No.: 12/631,283

(22) Filed: Dec. 4, 2009

(65) Prior Publication Data
US 2010/0296021 A1    Nov. 25, 2010

(30) Foreign Application Priority Data
May 25, 2009    (KR) .................. 10-2009-0045448

(51) Int. Cl.
*G02F 1/1333*    (2006.01)
(52) U.S. Cl.
USPC ............ 349/58; 349/60; 349/62; 349/63; 349/65; 349/84
(58) Field of Classification Search
USPC .............. 349/58, 60, 62, 63, 65, 84
See application file for complete search history.

(56) References Cited

U.S. PATENT DOCUMENTS

| | | | |
|---|---|---|---|
| 6,108,060 A | 8/2000 | Funamoto et al. | |
| 2003/0223020 A1 | 12/2003 | Lee | |
| 2004/0183956 A1 | 9/2004 | Kim et al. | |
| 2009/0316074 A1* | 12/2009 | Tomiyoshi | 349/65 |
| 2010/0171898 A1* | 7/2010 | Lee | 349/58 |
| 2010/0328570 A1* | 12/2010 | Kim et al. | 349/58 |

OTHER PUBLICATIONS

Communication and European Search Report issued on Aug. 6, 2010 in counterpart European Application No. 10157415.0.

* cited by examiner

*Primary Examiner* — Huyen Ngo
(74) *Attorney, Agent, or Firm* — Sughrue Mion, PLLC

(57) ABSTRACT

A backlight unit, light guide panel, and liquid crystal display (LCD) apparatus having the same are provided. The backlight unit includes a light guide panel which comprises a plurality of patterns to scatter light forward on a bottom surface, and one or more fixing grooves on an edge area; a light source unit which is disposed on a side surface of the light guide panel, and emits light towards the light guide panel; and a supporting member which supports the light guide panel, and comprises one ore more fixing protrusions being inserted into the fixing groove, wherein the amount of patterns formed on a darkness occurring area adjacent to the fixing groove is increased compared to that on an adjacent area, and the amount of patterns formed on a bright line occurring area adjacent to the fixing groove is decreased compared to that on an adjacent area.

30 Claims, 7 Drawing Sheets

LIQUID CRYSTAL DISPLAY APPARATUS HAVING DIFFERENT SIZE AND AMOUNT OF PATTERNS FORMED ON DIFFERENT AREAS OF BOTTOM SURFACE OF A LIGHT GUIDE PANEL OF A BACKLIGHT UNIT

CROSS-REFERENCE TO RELATED APPLICATIONS

This application claims priority from Korean Patent Application No. 10-2009-0045448, filed on May 25, 2009, in the Korean Intellectual Property Office, the disclosure of which is incorporated herein by reference in its entirety.

BACKGROUND

1. Field

Apparatuses consistent with the inventive concept relate to a backlight unit and a liquid crystal display (LCD) apparatus having the same, and more particularly, to an edge-lit backlight unit in which a light source is disposed on a side surface of a light guide panel (LGP) and an LCD apparatus having the same.

2. Description of the Related Art

General liquid crystal display (LCD) apparatuses include a liquid crystal panel which displays an image and a backlight unit (BLU) which is disposed on a rear surface of the liquid crystal panel and emits light towards the liquid crystal panel.

The backlight unit includes a light source which produces light. The back light unit may be a direct type backlight unit or an edge type backlight unit according to the position of the light source. In the direct type backlight unit, a light source is disposed on a rear surface of the backlight unit, and in the edge type backlight unit, a light source is disposed on a side surface of the backlight unit. Compared with the direct type backlight unit, the edge type backlight unit has low luminance and poor luminance uniformity, but is advantageous in that it is slimmer than the direct type backlight unit.

The edge type backlight unit includes a light guide panel (LGP) which guides light emitted from a light source towards a liquid crystal panel and a supporting member which supports the LGP. A plurality of fixing grooves are formed on an edge area of the LGP and a fixing protrusion is formed on the supporting member. The LGP may be fixed to the supporting member by the engagement between the fixing groove and the fixing protrusion.

However, because the fixing groove and the fixing protrusion are disposed in a light path between the light source and the LGP, they cause part of the light emitted towards the LGP to be blocked or scattered. Therefore, the luminance uniformity is deteriorated on a portion near the fixing protrusion, and a bright line or darkness occurs on an image.

Figure 1:
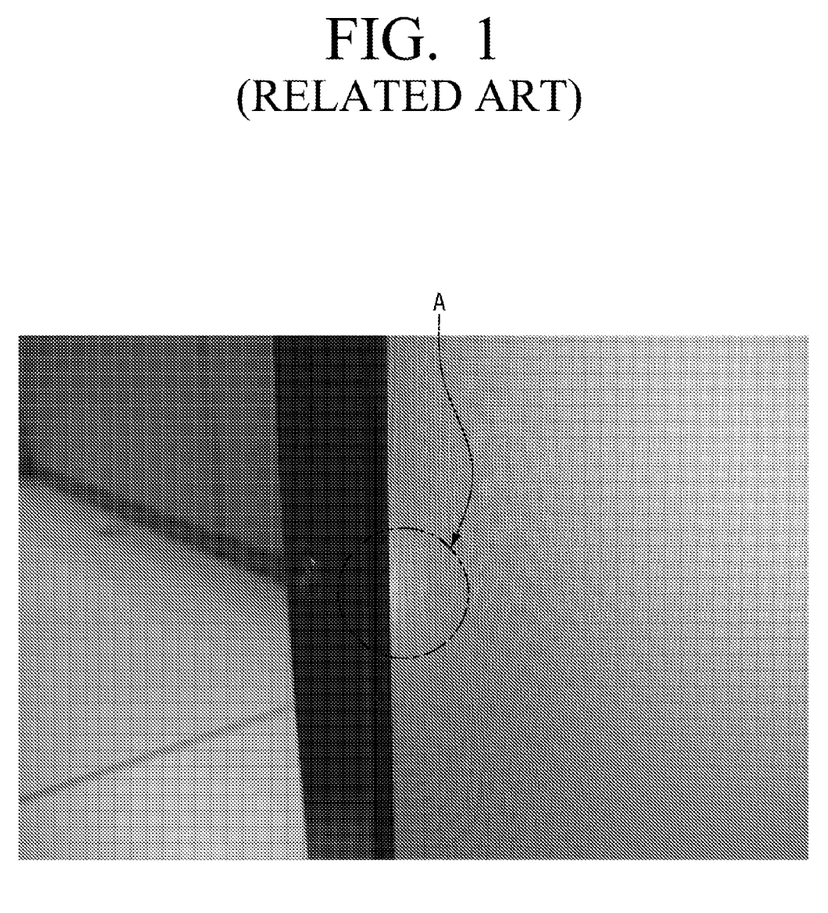
FIG. 1 is a photograph showing a screen of an LCD apparatus having a general edge type backlight unit.

The problem regarding the bright line or darkness is illustrated in FIG. 1. FIG. 1 is a photograph showing a screen of an LCD apparatus having a general edge type backlight unit. Referring to FIG. 1, a strong bright line appears on an area A. The strong bright line is caused by the fixing groove and the fixing protrusion.

The fixing groove formed on the LGP and the fixing protrusion formed on the supporting member may cause the image quality to be degraded.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide an LCD apparatus in which a bright line and darkness caused by a fixing groove formed on a light guide panel (LGP) and a fixing protrusion being inserted into the fixing groove are removed so that the image quality is improved.

According to a first exemplary embodiment, there is provided a backlight unit, including a light guide panel which includes a plurality of patterns to scatter light towards the front on a bottom surface, and one or more fixing grooves on an edge area; a light source unit which is disposed on a side surface of the light guide panel, and emits light towards the light guide panel; and a supporting member which supports the light guide panel, and includes one or more fixing protrusions being inserted into the fixing groove, wherein the amount of patterns formed on a darkness occurring area adjacent to the fixing groove is greater than the amount of patterns disposed on an area adjacent to the darkness occurring area, and the amount of patterns formed on a bright line occurring area adjacent to the fixing groove is decreased compared to that on an adjacent area.

According to a second exemplary embodiment, there is provided an LCD apparatus including a backlight unit according to the first exemplary embodiment.

More patterns may be formed on the darkness occurring area than on the adjacent area.

The size of patterns formed on the darkness occurring area may be larger than the size of patterns formed on the adjacent area.

The number of patterns formed on the bright line occurring area may be less than the number of patterns formed on the adjacent area.

The size of patterns formed on the bright line occurring area may be smaller than the size of patterns formed on the adjacent area.

A coating material having a black or gray color may be coated on a periphery of the fixing protrusion.

The darkness occurring area may be formed on a right rear area of the fixing groove.

The bright line occurring area may be formed on both sides of the right rear area of the fixing groove.

The supporting member may include a bottom plate which supports a bottom surface of the light guide panel; and four side plates which surround the bottom plate, wherein the fixing protrusion may be formed on the bottom plate.

The light source unit may include a driving substrate which is attached to an inner wall of the side plates; and a plurality of light sources which are formed on the driving substrate.

According a third exemplary embodiment, there is provided a backlight unit, including a light guide panel which includes a plurality of patterns on a bottom surface, and one or more fixing grooves on an edge area; a light source unit which is disposed on a side surface of the light guide panel, and emits light towards the light guide panel; and a supporting member which supports the light guide panel, and includes one or more fixing protrusions being inserted into the fixing groove, wherein the size or number of patterns formed on the darkness occurring area may be larger or more than that of patterns formed on an adjacent area.

According to a fourth exemplary embodiment, there is provided an LCD apparatus including a backlight unit according to the third exemplary embodiment.

According to a fifth exemplary embodiment, there is provided a backlight unit, including a light guide panel which includes a plurality of patterns on a bottom surface, and one or more fixing grooves on an edge area; a light source unit which is disposed on a side surface of the light guide panel, and emits light towards the light guide panel; and a supporting member which supports the light guide panel, and includes one ore more fixing protrusions being inserted into the fixing groove, wherein the size or number of patterns formed on the bright line occurring area may be larger or more than the size or number of patterns formed on an adjacent area.

According to a sixth exemplary embodiment, there is provided an LCD apparatus including a backlight unit according to the fifth exemplary embodiment.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

Figure 2:
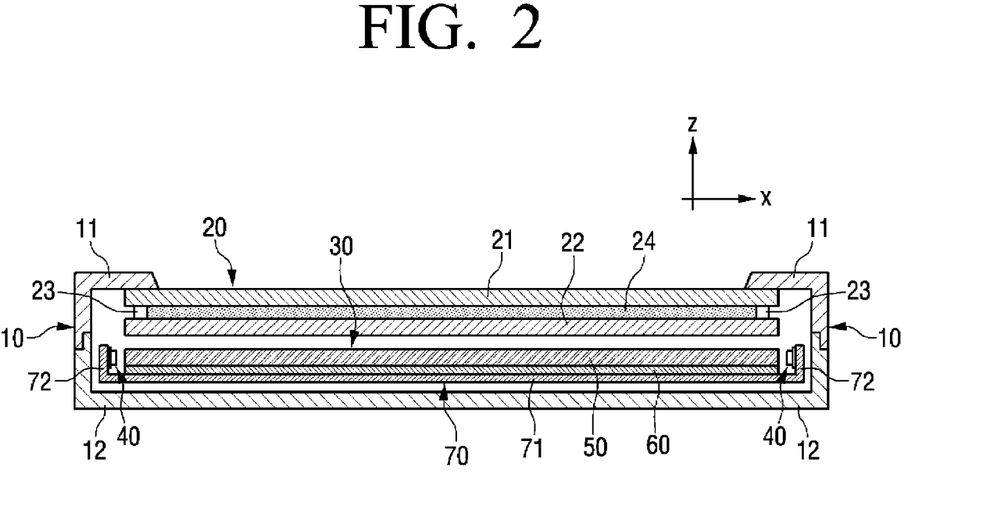
FIG. 2 is a schematic sectional view illustrating an LCD apparatus according to an exemplary embodiment.

FIG. 2 is a schematic sectional view illustrating an LCD apparatus according to an exemplary embodiment. A plurality of elements which are not directly related to an exemplary embodiment are omitted from FIG. 2 for convenience of description.

Referring to FIG. 2, an LCD apparatus according to an exemplary embodiment includes a housing 10, a liquid crystal panel 20, and a backlight unit 30.

The housing 10 houses elements of the LCD apparatus, including the liquid crystal panel 20 and the backlight unit 30, and supports the elements. The housing 10 includes a front housing 11 and a rear housing 12, and the front housing 11 is open towards the front so that an image may be exposed in the front.

The liquid crystal panel 20 includes a color filter substrate 21 having a color filter layer and a thin film transistor substrate 22 having a thin film transistor. The color filter substrate 21 and the thin film transistor substrate 22 are spaced apart from each other at a constant interval by a sealant 23, and a liquid crystal layer 24 is interposed between the color filter substrate 21 and the thin film transistor substrate 22.

The light emitted from the backlight unit 30 towards the liquid crystal panel 20 penetrates the liquid crystal layer 24, which adjusts the light transmittance. The color filter substrate 21 causes an image to be reproduced as a color image. The light transmittance is adjusted in the liquid crystal layer 24 by adjusting the arrangement of the molecular structure of the liquid crystal layer 24. The molecular structure of the liquid crystal layer 24 is adjusted by the thin film transistor substrate 22.

The backlight unit 30 is disposed in a rear portion of the housing 10 and provides a surface light towards the liquid crystal panel 20. The backlight unit 30 will be explained with reference to FIGS. 2, 3 and 4.

Figure 3:
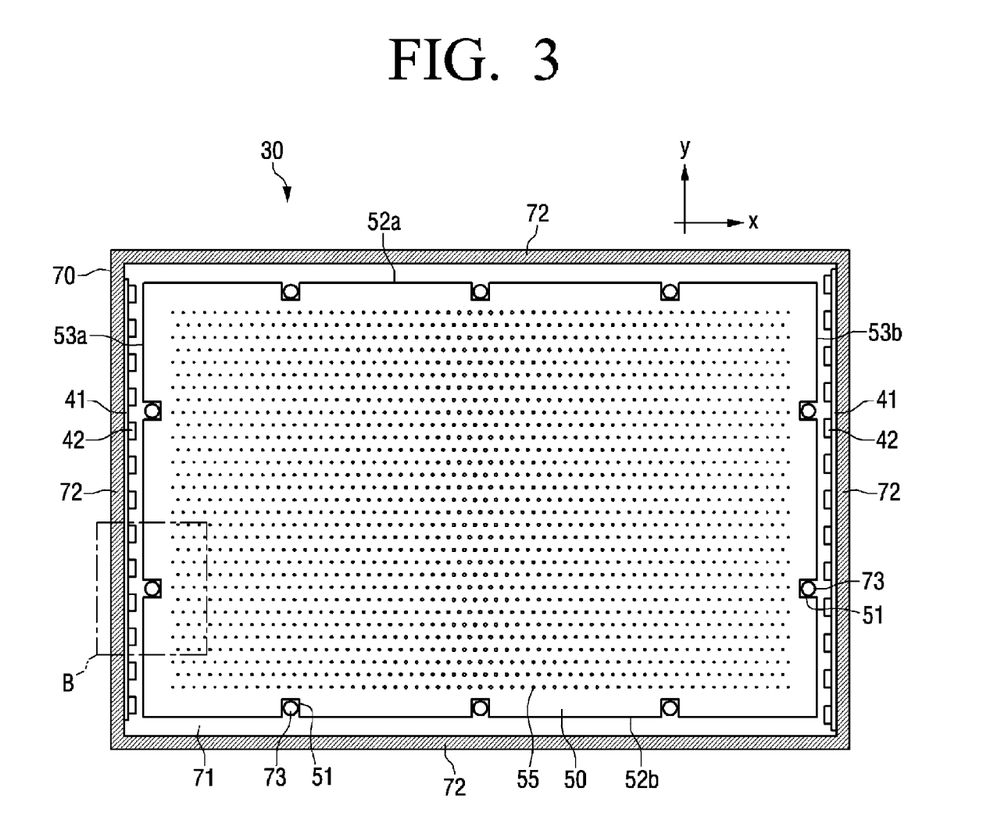
FIG. 3 is a schematic plan view illustrating a backlight unit included in the LCD apparatus of FIG. 2.
Figure 4:
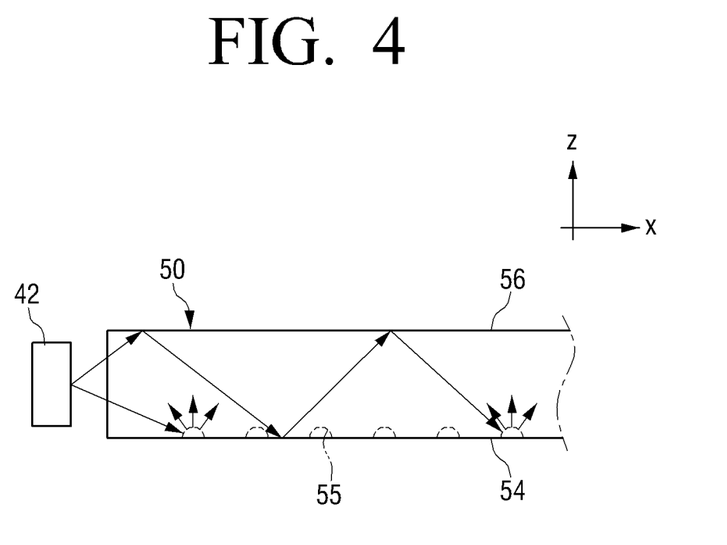
FIG. 4 is a view illustrating a light source and an LGP included in the backlight unit of FIG. 3, to explain the function of the LGP.

FIG. 3 is a schematic plan view illustrating the backlight unit 30 included in the LCD apparatus of FIG. 2, and FIG. 4 is a view illustrating a light source and a light guide panel included in the backlight unit of FIG. 3.

Referring to FIGS. 2 to 4, the backlight unit 30 includes a light source unit 40, a light guide panel 50, a reflection sheet 60, and a supporting member 70 for supporting the light guide panel 50.

A pair of light source units 40 are disposed at right and left side surfaces of the light guide panel 50. That is, the pair of light source units 40 are disposed on opposite sides of the light guide panel 50 in the direction indicated by arrow X. The light source unit 40 includes a driving substrate 41, and a plurality of light sources 42 which are arranged on the driving substrate 41 vertically, that is, the direction indicated by arrow Y.

The driving substrate 41 is attached to an inner wall of the supporting member 70, supports the light sources 42, and provides the light sources 42 with driving current. The plurality of light sources 42 may be light emitting diodes (LEDs), and emit white color light towards the light guide panel 50. Alternatively, the light sources 42 may be a fluorescent lamp.

The light guide panel 50 is disposed between the pair of light source units 40, and provides a surface light towards the liquid crystal panel 20 by converting a path of light emitted by the light sources 42.

The light guide panel 50 is made of transparent plastic such as poly methyl methacrylate (PMMA). The light guide panel 50 is configured in an approximately rectangular shape, and fixing grooves 51 having a square shape (in more detail, hexahedral shape) are formed on edge areas. The fixing grooves 51 are not limited to the square shape, and may be variously changed according to exemplary embodiments.

In more detail, three fixing grooves 51 are formed on each of both side surfaces 52a, 52b of the light guide panel 50 which is disposed in the direction indicated by arrow X, and two fixing grooves 51 are formed on each of both side surfaces 53a, 53b of the light guide panel 50 which is disposed in the direction indicated by arrow Y. Fixing protrusions 73 formed on the supporting member 70 are inserted into the fixing grooves 51 so that the light guide panel 50 may be firmly fixed to the supporting member 70.

A large number of patterns 55 are regularly arranged on a bottom surface 54 of the light guide panel 50 (see FIG. 4). The patterns 55 may be formed by a method for printing ink having a light scattering material on the bottom surface 54 of the light guide panel 50, a method for forming a groove on the bottom surface 54 of the light guide panel 50, and so on. In this exemplary embodiment, the grooves are formed on the bottom surface 54 of the light guide panel 50 using a laser to form the patterns 55.

By the patterns 55, the light generated by the light source 42 may be emitted towards the liquid crystal panel 20, that is, in the direction indicated by arrow Z. Referring to FIG. 4, the light emitted from the light source 42 inside the light guide panel 50 is totally reflected by the bottom surface 54 and a top surface 56 of the light guide panel 50. If the light is incident on the pattern 55 formed on the bottom surface 54 of the light guide panel 50, the light may be reflected or scattered towards the liquid crystal panel 20 by the geometric characteristic of the pattern 55.

According to an exemplary embodiment, the patterns 55 may become larger as they approach the center of the light guide panel 50, as illustrated in FIG. 3. Because the amount of the light transmitted from the light source 42 decreases as the light approaches the center of the light guide plate 50, comparatively larger patterns 55 are formed on the center of the light guide panel 50 to increase the luminance in that area so that surface light having uniform luminance is generated by the light guide panel 50.

The reflection sheet 60 (see FIG. 2) is disposed on a rear surface of the light guide panel 50, and reflects the light penetrating the rear surface of the light guide panel 50 towards the light guide panel 50, thus increasing the luminance of the surface light. A diffusion sheet (not shown) which diffuses the surface light generated by the light guide panel 50 and a prism sheet (not shown) which is disposed on an upper portion of the diffusion sheet and corrects a path of the light may be additionally provided between the light guide panel 50 and the liquid crystal panel 20, other than the reflection sheet 60.

The supporting member 70 may be made of aluminum, and includes a rectangular bottom plate 71 on which the light guide panel 50 is mounted and supported, and four side plates 72 which surround each side of the bottom plate 71. The light source unit 40 described above is installed on the inner surfaces of the right and left side surfaces 72 disposed in the direction indicated by arrow Y.

The plurality of fixing protrusions 73 which are protruded towards the light guide panel 50, that is the direction indicated by arrow Z, are provided on the bottom plate 71 of the supporting member 70. The number of the fixing protrusions 73 is the same as the number of the fixing grooves 51 formed on the light guide panel 50, and the fixing protrusions 73 are configured in a cylindrical shape. Herein, the fixing protrusions 73 are not limited to the cylindrical shape, may have various shape, such as a prism shape. As described above, the fixing protrusions 73 are inserted into the fixing grooves 51 of the light guide panel 50, and thus the light guide panel 50 is firmly fixed to the bottom plate 71 of the supporting member 70.

The fixing groove 51 formed on the light guide panel 50 and the fixing protrusion 73 formed on the supporting member 70 may deteriorate the luminance uniformity of the surface light generated by the light guide panel 50. That is, if the light encounters the fixing protrusion 73 or the fixing groove 51 before the light being emitted from the light source 42 enters inside the light guide panel 50, the light is scattered in an unintended direction by the fixing protrusion 73 or the fixing groove 51, and is transferred inside the light guide panel 50. As a result, a bright line occurring area or a darkness occurring area may be formed on an area adjacent to the fixing groove 51 on the light guide panel 50.

In the bright line occurring area, the light scattered by the fixing protrusion 73 or the fixing groove 51 is transmitted and thus the luminance is higher than in adjacent areas, and in the darkness occurring area, the light is not transmitted enough since the light path is blocked by the fixing protrusion 73, and thus the luminance is lower than in adjacent areas. If the bright line occurring area or the darkness occurring area is formed on the light guide panel 50, the bright line or darkness may be generated on edge areas of a screen (image).

Figure 5:
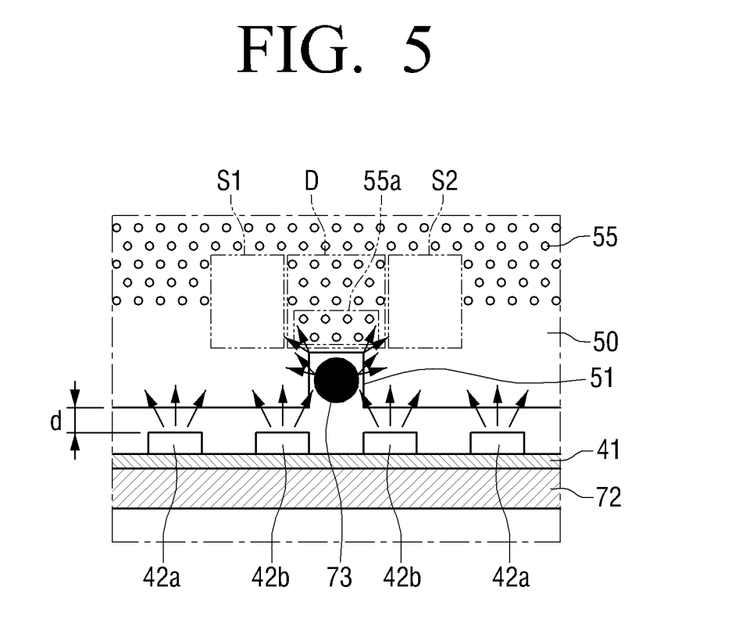
FIG. 5 is an enlarged view illustrating a portion B of FIG. 3 according to an exemplary embodiment of patterns on the LGP adjacent to a fixing groove or a fixing protrusion.
Figure 6:
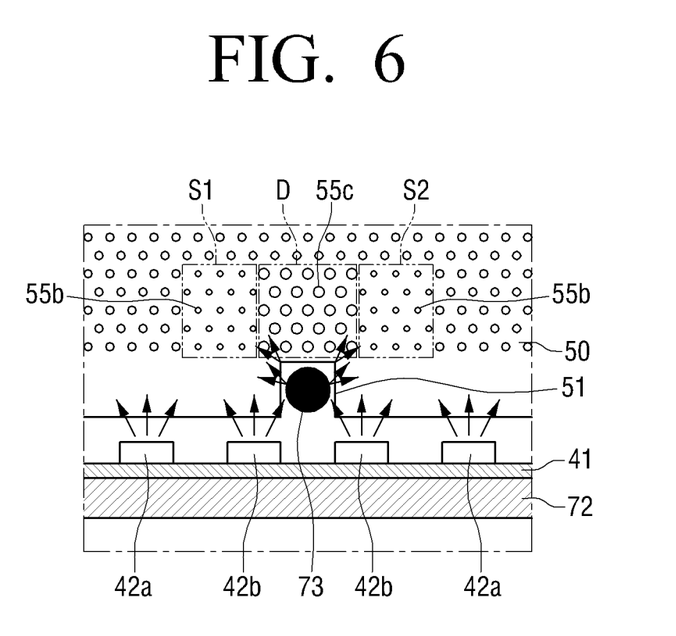
FIG. 6 is an enlarged view illustrating a portion B of FIG. 3 according to another exemplary embodiment of patterns on the LGP adjacent to a fixing groove or a fixing protrusion.

A method for solving a problem regarding the bright line occurring area and the darkness occurring area according to an exemplary embodiment will be explained with reference to FIGS. 5 and 6. FIG. 5 is an enlarged view illustrating a portion B of FIG. 3 according to an exemplary embodiment of patterns on the light guide panel adjacent to a fixing groove or a fixing protrusion, and FIG. 6 is an enlarged view illustrating a portion B of FIG. 3 according to another exemplary embodiment of patterns on the light guide panel adjacent to a fixing groove or a fixing protrusion.

First, the exemplary embodiment in FIG. 5 will be explained. The light guide panel 50 may be spaced apart from the light sources 42a, 42b at a predetermined interval. For example, a distance (d) between the light guide panel 50 and the light sources 42a, 42b may be equal to or greater than approximately 5 mm. This is because a straight bright line may appear on an edge area of the light guide panel 50 if the distance (d) between the light guide panel 50 and the light sources 42a, 42b is too small.

As illustrated in FIG. 5, the light emitted from the light sources 42a spaced apart from the fixing protrusion 73 is transmitted inside the light guide panel 50 with almost no effect by the fixing protrusion 73 and the fixing groove 51. However, a part of the light being emitted from the light sources 42b adjacent to the fixing protrusion 73 is scattered by the fixing protrusion 73 or the fixing groove 51 and thus the scattered part of the light may be abnormally transmitted inside the light guide panel 50.

Therefore, a darkness occurring area D and a bright line occurring areas S1, S2 may be formed on an area adjacent to the fixing groove 51. As illustrated in FIG. 5, the darkness occurring area D may be formed on a right rear portion of the fixing groove 51 or the fixing protrusion 73, and the bright line occurring areas S1, S2 may be formed on both sides of a right rear portion of the darkness occurring area D in the diagonal direction with respect to the fixing groove 51. However, the portions on which the darkness occurring area D and the bright line occurring areas S1, S2 occur may be changed according to the shape of the fixing protrusion 73, the shape of the fixing groove 51, and the position of the light sources 42.

Referring continuously to FIG. 5, the patterns 55 are not formed on the bright line occurring areas S1, S2, whereas additional patterns 55a are formed on the darkness occurring area D. By not forming patterns 55 on the bright line occurring areas S1 and S2, the amount of formed patterns is decreased on the bright line occurring areas S1, S2 as compared to that on an adjacent area of the same size. Similarly, by forming additional patterns 55a on the darkness occurring area D, the amount of formed patterns is increased on the darkness occurring area D as compared to that on an adjacent area. The amount of formed patterns may be defined as an area or volume occupied by a pattern per unit area of the light guide panel 50.

As the amount of patterns formed on the bright line occurring areas S1, S2 is decreased as compared to that on an adjacent area, the luminance of the bright line occurring areas S1, S2 is decreased to a level similar to that of the adjacent area. As the amount of patterns formed on the darkness occurring areas D is increased as compared to that on an adjacent area, the luminance of the darkness occurring areas D is increased to a level similar to that of the adjacent area. Accordingly, the uniformity of the surface light generated by the light guide panel 50 can be prevented from being degraded by the fixing groove 51 or the fixing protrusion 73. Thus, the fixing groove 51 or the fixing protrusion 73 may not cause the bright line or the darkness to appear on an image.

The exemplary embodiment shown in FIG. 6 will now be explained. As illustrated in FIG. 6, small patterns 55b are formed within the bright line occurring areas S1, S2, in order to decrease the amount of patterns formed on the bright line occurring areas S1, S2. In addition, large patterns 55c are formed within the darkness occurring areas D, in order to increase the amount of patterns formed on the darkness occurring areas D.

According to the exemplary embodiment illustrated in FIG. 6, the bright line or the darkness caused by the fixing groove 51 or the fixing protrusion 73 may be prevented from appearing on an image, like in the exemplary embodiment illustrated in FIG. 5. That is, the decreased size of patterns in the bright line occurring areas S1, S2 decrease the luminance of the bright line occurring areas S1, S2, while the increased size of patterns in the darkness occurring area D increases the luminance of the darkness occurring area D.

An outer surface of the fixing protrusion 73 is coated with a coating material having a black color as illustrated in FIGS. 5 and 6. The outer surface of the fixing protrusion 73 is a dark color such as black and gray, to reduce the amount of the light scattered by the fixing protrusion 73. This causes the darkness or the bright line caused by the fixing protrusion 73 to be less noticeable.

A method for adjusting the number of patterns is provided in the exemplary embodiment of FIG. 5 and a method for adjusting the size of patterns is provided in the exemplary embodiment of FIG. 6 in order to solve problems regarding the bright line and the darkness caused by the fixing protrusion 73 and the fixing groove 51. Of course, a method for adjusting the number and size of patterns may also be applied as another exemplary embodiment.

Figure 7:
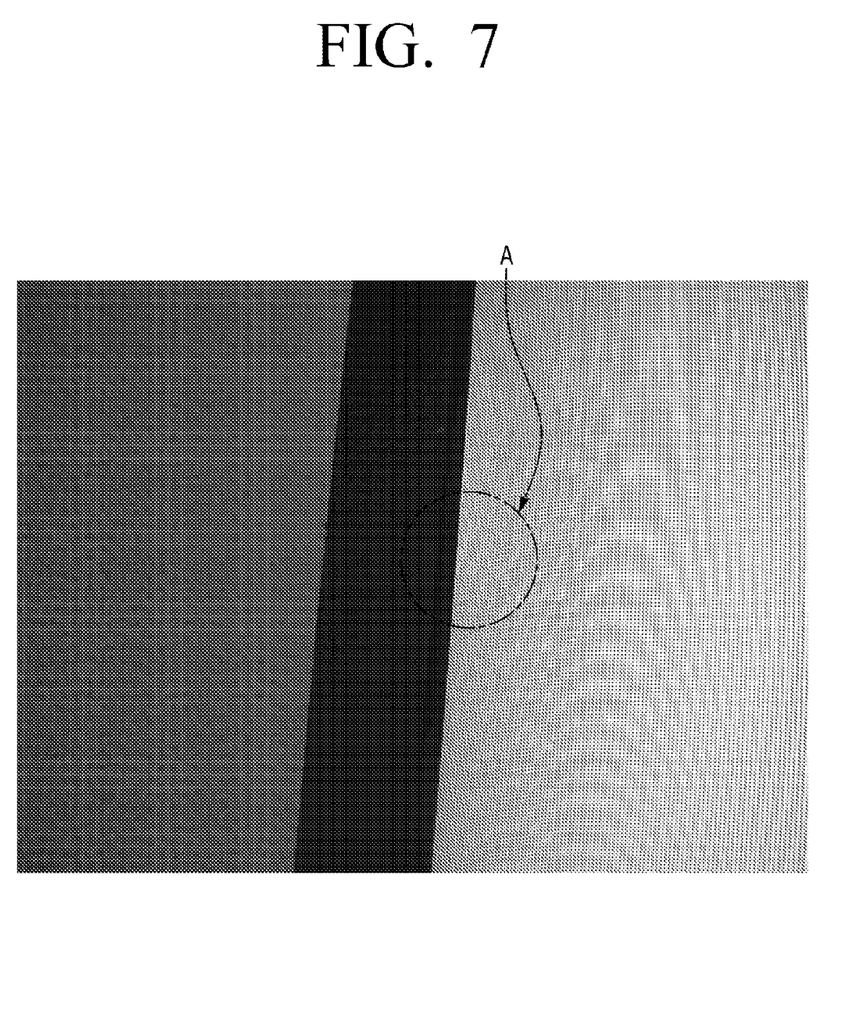
FIG. 7 is a photograph showing a screen of an LCD apparatus having a backlight unit according to an exemplary embodiment.

FIG. 7 is a photograph showing a screen of an LCD apparatus having a backlight unit according to an exemplary embodiment. Referring to FIG. 7, even if the fixing protrusion 73 or the fixing groove 51 is formed on the backlight unit 30 of the LCD apparatus, a bright line which appears on a related art LCD apparatus does not appear anymore.

As described above, in an LCD apparatus according to an exemplary embodiment, the patterns 55 are formed on the light guide panel 50 so that the amount of patterns formed on a bright line occurring area is decreased and the amount of patterns formed on a darkness occurring area is increased compared to that on an adjacent area, to generate a surface light having uniform luminance. Therefore, the bright line and the darkness caused by the fixing grooves 51 of the light guide panel 50 and the fixing protrusions 73 of the supporting member 70 may be prevented. Thus, the image quality of the LCD apparatus may be improved.

The foregoing exemplary embodiments and advantages are merely exemplary and are not to be construed as limiting. The inventive concept can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A backlight unit comprising:
a light guide panel which comprises at least one fixing groove formed on a side surface of the light guide panel, and a plurality of patterns formed on a bottom surface of the light guide panel to scatter light;
a light source unit which is disposed at the side surface of the light guide panel, and emits light towards the light guide panel; and
a supporting member which supports the light guide panel, and comprises at least one fixing protrusion inserted into the fixing groove,
wherein an amount of patterns formed on a first area of the bottom surface of the light guide panel adjacent to the fixing groove is greater than an amount of the patterns formed on an area of the bottom surface of the light guide panel adjacent to the first area, and an amount of patterns formed on a second area of the bottom surface of the light guide panel adjacent to the fixing groove is less than an amount of patterns formed on an area of the bottom surface of the light guide panel adjacent to the second area.

2. The backlight unit as claimed in claim 1, wherein the first area is a darkness occurring area and the second area is a bright line occurring area.

3. The backlight unit as claimed in claim 2, wherein the first area is adjacent to the second area, and the amount of the patterns formed on the first area is greater than the amount of patterns formed on the second area.

4. The backlight unit as claimed in claim 2, wherein a size of the patterns formed on the first area is larger than a size of the patterns formed on the area adjacent to the first area.

5. The backlight unit as claimed in claim 2, wherein no patterns are formed on the second area.

6. The backlight unit as claimed in claim 2, wherein a size of patterns formed on the second area is smaller than a size the patterns formed on the area adjacent to the second area.

7. The backlight unit as claimed in claim 2, wherein a coating material having black or gray color is coated on a periphery of the fixing protrusion.

8. The backlight unit as claimed in claim 2, wherein the first area is disposed on a right rear area of the fixing groove.

9. The backlight unit as claimed in claim 2, wherein the first area is disposed on both sides of the right rear area of the fixing groove.

10. The backlight unit as claimed in claim 2, further supporting member comprises:
a bottom plate which supports a bottom surface of the light guide panel; and
four side plates which surround the bottom plate,
wherein the fixing protrusion is formed on the bottom plate.

11. The backlight unit as claimed in claim 10, wherein the light source unit comprises:
a driving substrate which is attached to an inner wall of the side plates; and
a plurality of light sources which are formed on the driving substrate.

12. A backlight unit comprising:
a light guide panel which comprises at least one fixing groove formed on a side surface of the light guide panel, and a plurality of patterns formed on a bottom surface of the light guide panel to scatter light;
a light source unit which is disposed at the side surface of the light guide panel, and emits light towards the light guide panel; and
a supporting member which supports the light guide panel, and comprises at least one fixing protrusion inserted into the fixing groove,
wherein a size or number of the patterns formed on a first area of the bottom surface of the light guide plate is greater than a size or number of the patterns formed on a second area adjacent to the first area.

13. The backlight unit as claimed in claim 12, wherein the first area is a darkness occurring area.

14. A backlight unit comprising:
a light guide panel which comprises at least one fixing groove formed on a side surface of the light guide panel, and a plurality of patterns formed on a bottom surface of the light guide panel to scatter light;
a light source unit which is disposed at the side surface of the light guide panel, and emits light towards the light guide panel; and
a supporting member which supports the light guide panel, and comprises at least one fixing protrusion inserted into the fixing groove,
wherein a size or number of the patterns formed on the first area is less than a size or number of the patterns formed on a second area adjacent to the first area.

15. The backlight unit as claimed in claim 14, wherein the first area is a bright line occurring area.

16. A liquid crystal display (LCD) apparatus comprising:
a liquid crystal panel; and
a backlight unit which provides light emitted towards the liquid crystal panel,
wherein the backlight unit comprises:
a light guide panel which comprises at least one fixing groove formed on a side surface of the light guide panel, and a plurality of patterns formed on a bottom surface of the light guide panel to scatter light towards the liquid crystal panel;
a light source unit which is disposed at the side surface of the light guide panel, and emits light towards the light guide panel; and
a supporting member which supports the light guide panel, and comprises at least one fixing protrusion inserted into the fixing groove, and
wherein an amount of patterns formed on a first area of the bottom surface of the light guide panel adjacent to the fixing groove is greater than an amount of the patterns formed on an area of the bottom surface of the light guide panel adjacent to the first area, and an amount of patterns formed on a second area of the bottom surface of the light guide panel adjacent to the fixing groove is less than an amount of patterns formed on an area of the bottom surface of the light guide panel adjacent to the second area.

17. The LCD apparatus as claimed in claim 16, wherein the first area is a darkness occurring area and the second area is a bright line occurring area.

18. The LCD apparatus as claimed in claim 17, wherein the first area is adjacent to the second area, and the amount of the patterns formed on the first area is greater than the amount of patterns formed on the second area.

19. The LCD apparatus as claimed in claim 17, wherein a size of the patterns formed on the first area is larger than a size of the patterns formed on the area adjacent to the first area.

20. The LCD apparatus as claimed in claim 17, wherein no patterns are formed on the second area.

21. The LCD apparatus as claimed in claim 17, wherein a size of patterns formed on the second area is smaller than a size the patterns formed on the area adjacent to the second area.

22. The LCD apparatus as claimed in claim 17, wherein a coating material having black or gray color is coated on a periphery of the fixing protrusion.

23. A liquid crystal display (LCD) apparatus comprising:
a liquid crystal panel; and
a backlight unit which provides a light emitted towards the liquid crystal panel,
wherein the backlight unit comprises:
a light guide panel which comprises at least one fixing groove formed on a side surface of the light guide panel, and a plurality of patterns formed on a bottom surface of the light guide panel to scatter light;
a light source unit which is disposed at the side surface of the light guide panel, and emits light towards the light guide panel; and
a supporting member which supports the light guide panel, and comprises at least one fixing protrusion inserted into the fixing groove, and
wherein a size or number of the patterns formed on a first area of the bottom surface of the light guide plate is greater than a size or number of the patterns formed on a second area adjacent to the first area.

24. The LCD apparatus as claimed in claim 23, wherein the first area is a darkness occurring area.

25. A liquid crystal display (LCD) apparatus comprising:
a liquid crystal panel; and
a backlight unit which provides light emitted towards the liquid crystal panel,
wherein the backlight unit comprises:
a light guide panel which comprises at least one fixing groove formed on a side surface of the light guide panel, and a plurality of patterns formed on a bottom surface of the light guide panel to scatter light;
a light source unit which is disposed at the side surface of the light guide panel, and emits light towards the light guide panel; and
a supporting member which supports the light guide panel, and comprises at least one fixing protrusion inserted into the fixing groove, and
wherein a size or number of the patterns formed on the first area is less than a size or number of the patterns formed on a second area adjacent to the first area.

26. The LCD apparatus as claimed in claim 1, wherein the first area is a bright line occurring area.

27. A backlight unit comprising:
a light guide panel which comprises at least one recessed portion formed on a side surface of the light guide panel, and a plurality of patterns formed on a bottom surface of the light guide panel to scatter light; and
a light source unit which is disposed at the side surface of the light guide panel, and emits light towards the light guide panel,
wherein a number or size of the patterns formed on a first area of the bottom surface of the light guide plate that is adjacent to the recessed portion is greater than a number or size of the patterns formed on another area of the bottom surface of the light guide plate that is adjacent to and the same size as the first area.

28. The backlight unit as claimed in claim 27, wherein the first area is a darkness occurring area.

29. The backlight unit as claimed in claim 28, wherein a number or size of the patterns formed on second and third areas of the bottom surface of the light guide plate is less than other areas of the bottom surface of the light guide plate that are adjacent to and the same size as the second and third areas,
the second and third are adjacent to opposite sides of the first area, respectively, and are offset from the recessed portion, and
the second and third areas are a bright line occurring areas.

30. The backlight unit as claimed in claim 28, wherein there are no patterns formed on second and third areas of the bottom surface of the light guide plate, the second and third areas adjacent to opposite sides of the first area, respectively, and are offset from the recessed portion, and the second and third areas are a bright line occurring areas.

* * * * *